United States Patent
Schukalski et al.

(10) Patent No.: US 11,260,775 B2
(45) Date of Patent: Mar. 1, 2022

(54) VEHICLE SEAT ASSEMBLY WITH A STATIONARY BASE RAIL AND A SEAT RAIL WHICH CAN BE MOVED RELATIVE THERETO AND WITH A DRIVE DEVICE WHICH IS ARRANGED ON THE BASE RAIL

(71) Applicant: Brose Fahrzeugteile GmbH & Co. Kommanditgesellschaft, Coburg, Coburg (DE)

(72) Inventors: Juergen Schukalski, Kueps (DE); Gregor Kroener, Bischberg (DE); Joerg Gropp, Boehlen (DE); Jochen Hofmann, Marktgraitz (DE)

(73) Assignee: Brose Fahrzeugteile GmbH & Co. Kommanditgesellschaft, Coburg, Coburg (DE)

(*) Notice: Subject to any disclaimer, the term of this patent is extended or adjusted under 35 U.S.C. 154(b) by 49 days.

(21) Appl. No.: 16/467,183

(22) PCT Filed: Dec. 6, 2017

(86) PCT No.: PCT/EP2017/081629
§ 371 (c)(1),
(2) Date: Sep. 10, 2019

(87) PCT Pub. No.: WO2018/104365
PCT Pub. Date: Jun. 14, 2018

(65) Prior Publication Data
US 2019/0389331 A1 Dec. 26, 2019

(30) Foreign Application Priority Data
Dec. 8, 2016 (DE) .......................... 102016224512.0

(51) Int. Cl.
*B60N 2/06* (2006.01)
*B60N 2/02* (2006.01)
*B60N 2/07* (2006.01)

(52) U.S. Cl.
CPC ........... *B60N 2/067* (2013.01); *B60N 2/0232* (2013.01); *B60N 2/07* (2013.01); *B60N 2002/0236* (2013.01)

(58) Field of Classification Search
CPC ........ B60N 2/067; B60N 2/0232; B60N 2/07; B60N 2002/0236; B60N 2/075; B60N 2/06
See application file for complete search history.

(56) References Cited

U.S. PATENT DOCUMENTS

| 5,121,895 A | 6/1992 | Ikegaya et al. |
| 5,267,717 A * | 12/1993 | Isomura ................. B60N 2/067 248/419 |

(Continued)

FOREIGN PATENT DOCUMENTS

| CN | 101213106 A | 7/2008 |
| CN | 104245410 A | 12/2014 |

(Continued)

*Primary Examiner* — Nkeisha Smith
(74) *Attorney, Agent, or Firm* — Brooks Kushman, P.C.

(57) ABSTRACT

A vehicle seat assembly comprising a seat frame and at least one rail pair that has a seat rail which is connected to the seat frame and a base rail which is to be connected to the vehicle base and on which the seat rail is movably guided along a longitudinal direction. A drive device is used to move the seat rail along the longitudinal direction relative to the base rail and has a spindle, a rotatable spindle nut which is mounted on the spindle via a threaded engagement, a drive unit which is operatively connected to the spindle nut, and an electric motor for driving the spindle nut via the transmission unit. The spindle is arranged on the seat rail, and the (Continued)

spindle nut and the transmission unit are arranged on the base rail.

18 Claims, 3 Drawing Sheets

(56) References Cited

U.S. PATENT DOCUMENTS

| | | | | |
|---|---|---|---|---|
| 7,303,223 | B2 * | 12/2007 | Nakamura | B60N 2/0232 248/429 |
| 7,325,851 | B2 * | 2/2008 | Ito | B60N 2/067 248/429 |
| 7,503,537 | B2 * | 3/2009 | Koga | B60N 2/067 248/429 |
| 8,061,756 | B2 * | 11/2011 | Kimata | B60N 2/0715 296/65.17 |
| 8,348,326 | B2 * | 1/2013 | Koga | B60N 2/067 296/65.15 |
| 8,464,993 | B2 * | 6/2013 | Muraishi | B60N 2/0705 248/429 |
| 8,523,263 | B2 * | 9/2013 | Kimura | B60N 2/0705 296/65.13 |
| 8,733,725 | B2 * | 5/2014 | Kimura | B60N 2/067 248/429 |
| 8,967,584 | B2 * | 3/2015 | Enokijima | B60N 2/0727 248/429 |
| 9,114,733 | B2 * | 8/2015 | Pluta | B60N 2/06 |
| 9,511,685 | B2 * | 12/2016 | Enokijima | B60N 2/0705 |
| 9,840,167 | B2 * | 12/2017 | Mixon | B60N 2/0722 |
| 10,220,732 | B2 * | 3/2019 | Auer | B60N 2/0843 |
| 10,300,812 | B2 * | 5/2019 | Flieger | B60N 2/067 |
| 10,351,019 | B2 * | 7/2019 | Keyser | B60N 2/067 |
| 10,363,838 | B2 * | 7/2019 | Runde | B60N 2/123 |
| 10,486,554 | B2 * | 11/2019 | Napau | B60N 2/06 |
| 10,562,411 | B2 * | 2/2020 | Higuchi | F16H 1/20 |
| 10,618,431 | B2 * | 4/2020 | Higuchi | B60N 2/075 |
| 10,647,223 | B2 * | 5/2020 | Arakawa | B60N 2/1635 |
| 10,688,887 | B2 * | 6/2020 | Tsuji | B60N 2/0722 |
| 10,736,428 | B2 * | 8/2020 | Okamoto | B60N 2/929 |
| 10,759,311 | B2 * | 9/2020 | Petit | B60N 2/0715 |
| 10,793,022 | B2 * | 10/2020 | Angerer | B60N 2/0232 |
| 10,814,747 | B2 * | 10/2020 | Angerer | F16H 25/2003 |
| 10,830,310 | B2 * | 11/2020 | Hudson | B60N 2/2251 |
| 2005/0082890 | A1 | 4/2005 | Taubmann et al. | |
| 2006/0213302 | A1 | 9/2006 | Hoffmann et al. | |
| 2006/0237987 | A1 * | 10/2006 | Nakamura | B60N 2/067 296/65.13 |
| 2006/0249644 | A1 * | 11/2006 | Folliot | B60N 2/0232 248/429 |
| 2010/0133408 | A1 * | 6/2010 | Umezaki | B60N 2/067 248/429 |
| 2010/0320352 | A1 * | 12/2010 | Weber | F16H 25/20 248/429 |
| 2015/0210187 | A1 * | 7/2015 | Harleb | B60N 2/0705 248/429 |
| 2015/0367753 | A1 | 12/2015 | Watanabe et al. | |
| 2016/0280094 | A1 | 9/2016 | Frye et al. | |
| 2017/0253145 | A1 * | 9/2017 | Runde | B60N 2/0715 |
| 2019/0202322 | A1 * | 7/2019 | Napau | B60N 2/067 |
| 2019/0381915 | A1 * | 12/2019 | Taniguchi | B60N 2/0705 |
| 2020/0039389 | A1 * | 2/2020 | Stemmer | B60N 2/0232 |
| 2020/0130538 | A1 * | 4/2020 | Emrich | B60N 2/0705 |
| 2020/0156507 | A1 * | 5/2020 | Sprenger | B60N 2/0705 |
| 2020/0171981 | A1 * | 6/2020 | Imamura | B60N 2/067 |
| 2020/0198501 | A1 * | 6/2020 | Lee | B60N 2/08 |
| 2020/0215936 | A1 * | 7/2020 | Teer | B60N 2/0707 |
| 2020/0282865 | A1 * | 9/2020 | Samain | B60N 2/66 |

FOREIGN PATENT DOCUMENTS

| | | |
|---|---|---|
| DE | 19815283 A1 | 10/1999 |
| DE | 10109184 A1 | 8/2002 |
| DE | 10361874 A1 | 7/2005 |
| DE | 102006022947 B3 | 9/2007 |
| DE | 102010063044 A1 | 6/2012 |
| EP | 0026582 B1 | 1/1985 |
| EP | 1658451 B1 | 3/2013 |
| FR | 2909047 A1 | 5/2008 |
| FR | 2910393 A1 | 6/2008 |
| WO | 2011150489 A1 | 12/2011 |

* cited by examiner (A-A)

VEHICLE SEAT ASSEMBLY WITH A STATIONARY BASE RAIL AND A SEAT RAIL WHICH CAN BE MOVED RELATIVE THERETO AND WITH A DRIVE DEVICE WHICH IS ARRANGED ON THE BASE RAIL

CROSS-REFERENCE TO RELATED APPLICATIONS

This application is the U.S. National Phase of PCT/EP2017/081629 filed Dec. 6, 2017, which claims priority to DE 10 2016 224 512.0 filed Dec. 8, 2016, the disclosures of which are hereby incorporated in their entirety by reference herein.

TECHNICAL FIELD

The present disclosure relates to a vehicle seat assembly.

BACKGROUND

A vehicle seat assembly may include a seat frame and at least one pair of rails which has a seat rail that is connected to the seat frame and one base rail that is to be connected to the vehicle floor. The seat rail is guided so as to be displaceable along a longitudinal direction on the base rail. The longitudinal position of the seat frame can be adapted by longitudinally adjusting the seat rail, where in, for adjusting the seat rail, a drive installation is provided, which has a spindle, a rotatable spindle nut that by way of a thread engagement is mounted so as to be rotatable on the spindle, a gearbox unit that is operatively connected to the spindle nut, and an electric motor for driving the spindle nut by way of the gearbox unit.

SUMMARY

One or more objects of the present disclosure may be achieved by providing a vehicle seat assembly that may include a drive installation for driving the longitudinal adjustment of the seat frame can be constructed so as to be favorable in terms of installation space.

Accordingly, the spindle may be disposed on the seat rail, while the spindle nut and the gearbox unit are disposed on the base rail.

In the case of the vehicle seat assembly, the position of the spindle on the one hand, and of the spindle nut and gearbox unit on the other, are thus reversed as compared to the vehicle seat assemblies conventionally used. While the spindle may be conventionally disposed so as to be stationary on the base rail and, by contrast, the spindle nut and the gearbox unit are fastened to the seat rail, it is now proposed for the spindle to be disposed on the seat rail and for the spindle nut and the gearbox unit to be disposed on the base rail. It results on account thereof that the spindle and the gearbox unit are not conjointly moved in the adjustment of the seat rail but in any adjustment rather remain locationally fixed on the base rail. It also results on account thereof that the electric motor that is operatively connected to the gearbox unit is not conjointly moved in the adjustment of the seat rail but may remain so as to be locationally fixed, which may enable the electric motor to be hidden in the region of the base rail, for example to be integrated in the vehicle floor such that the electric motor is not visible from the outside.

In one or more embodiments, the vehicle seat assembly has two pairs of rails, one drive installation being in each case assigned to each of said two pairs of rails. Each pair of rails thus has a dedicated drive installation so that the pairs of rails are driven by (in spatial terms) separate drive installations. A control installation may be provided for actuating the drive installations such that a synchronous adjustment movement is guaranteed on the pairs of rails.

On account of the provision of dedicated drive installations on the pairs of rails, the installation space between the pairs of rails may remain free. Shafts which extend from a (single) drive installation to the different pairs of rails are not required. The drive installation assigned to one pair of rails may rather be attached directly in the region of the pair of rails, for example beside or below the base rail, so that the installation space between the pairs of rails remains free.

In another embodiment, the gearbox unit has a gearbox housing which is fixedly connected to the base rail. The spindle nut may be mounted in the gearbox housing, wherein the gearbox housing by way of an anti-rotation safeguard is established so as to be secured against rotation on the base rail.

The gearbox housing may, for example, be engaged through an opening of the base rail such that the spindle nut that is disposed within the base rail may be driven by gearbox elements of the gearbox unit which are encapsulated in the gearbox housing. The electric motor of the drive installation may thus be attached outside the base rail, for example below the base rail, and is fastened to the base rail conjointly with the gearbox housing. The electric motor is coupled to the spindle nut by way of gearbox parts of the gearbox unit such that the spindle nut may be driven by way of the electric motor.

The gearbox housing by way of a holding angle bracket may be fastened to the base rail, for example. The holding angle bracket may have, for example, a substantially U-shaped design and may be disposed on the base rail such that the holding angle bracket engages through the opening of the base rail and thereby establishes the gearbox housing on the base rail. The gearbox housing by way of the holding angle bracket is supported in a crash-resistant manner on the base rail such that the load forces acting in the event of a crash may be reliably absorbed and discharged.

The holding angle bracket has a U-shaped design, for example, and encompasses the gearbox housing. The gearbox housing may lie between legs of the U-shaped holding angle bracket, for example. The legs are connected to one another by way of a base and configure a receptacle for the gearbox housing. For example, the holding angle bracket herein is connected to a base of the base rail by way of flanges that adjoin the legs.

The gearbox housing, when viewed along the longitudinal direction, may be supported on both sides on the holding angle bracket. To this end, the gearbox housing may lie between the legs of the holding angle bracket in such a manner that the gearbox housing is in bearing contact with both legs and is thus supported in the longitudinal direction as well as counter to the longitudinal direction on the holding angle bracket.

The opening through which the gearbox housing engages is configured on a base of the base rail that faces away from the seat rail, for example. The base of the base rail, when attaching the pair of rails to a vehicle floor, faces the vehicle floor. The electric motor herein may be disposed on a side of the base that faces away from the seat rail, for example, and may lie in an assigned recess or an assigned duct in the vehicle floor, for example, such that the electric motor is received in the vehicle floor and is substantially invisible from the outside.

It is conceivable and possible herein for the pairs of rails to be entirely sunk in the vehicle floor, for example in that the pairs of rails of the vehicle seat assembly are received in ducts provided to this end in the vehicle floor. The pairs of rails may thus be outwardly obscured, for example in that a carpet is installed over the vehicle floor, said carpet covering the pairs of rails toward the outside. Slots through which assembly parts for connecting the pairs of rails to the seat frame engage may be disposed in the carpet.

The gearbox unit may have a spur gearing, for example, which may include at least two spur gears which engage so as to mesh with one another. This represents a departure from the conventionally used concept of a gearbox unit for driving a pair of rails for the purpose of the longitudinal adjustment. A spindle nut is conventionally driven by way of a drive worm having a worm toothing. Departing therefrom, it is now proposed that a spur gearing in which the spindle nut is driven by way of an assigned spur gear is used. While the rotation axis of the drive worm in the case of a conventional assembly is directed so as to be transverse to the rotation axis of the spindle nut, the assembly now proposed enables the rotation axes of the spindle nut and of the spur gear that meshes with the spindle nut to be aligned so as to be mutually parallel, this being potentially favorable in terms of installation space.

The spur gears of the spur gearing may be helically toothed, for example. This enables a high efficiency of the gearbox unit, which may also enable an electric motor of a comparatively small construction mode (and with a comparatively low output) to be used, for example.

The at least two spur gears of the gearbox unit herein may be rotatable about rotation axes which extend so as to be mutually parallel and are aligned along the longitudinal direction. The rotation axes of the spur gears, like the rotation axis of the spindle nut to be moved about the spindle, thus point along the longitudinal direction.

In one design embodiment, the gearbox unit has two gear ranges. In this way, a high negative gearing may be provided such that a rotating movement of the drive shaft of the electric motor may be transmitted in a heavily reduced manner to the spindle nut.

In one design embodiment, the spindle nut by way of an external toothing meshes with a spur gear of the gearbox unit and is drivable by way of said spur gear.

The meshing engagement of the spindle nut with the spur gear herein is preferably designed so as not to be self-locking. A self-locking mechanism may however exist between the spindle nut and the spindle by virtue of the thread engagement by way of which the spindle nut is mounted on the spindle. The gearbox unit overall is thus self-locking by virtue of the self-locking mechanism in the operative connection between the spindle and the spindle nut.

It may be provided herein that only the engagement between the spindle nut and the spindle is self-locking but other gearbox parts do not interact in a self-locking manner. This enables a further improved efficiency of the gearbox unit.

In one design embodiment, the electric motor has a driveshaft which extends along the longitudinal direction and is rotatable about the longitudinal direction. The electric motor is thus longitudinally directed and may be disposed so as to be rail-parallel to the assigned base rail. This enables a compact attachment of the electric motor to the base rail, in particular below the base rail. An assembly which is favorable in terms of installation space results on account thereof, on the one hand. On the other hand, the assembly, while offering favorable protection to the electric motor is facilitated because the handling of the rail assembly having an electric motor attached thereto is simplified by virtue of the tightly bearing attachment of the electric motor in a rail-parallel manner to the base rail, and parts of the electric motor barely project from the pair of rails.

In one embodiment, the drive shaft of the electric motor supports a first spur gear which engages so as to mesh with the second spur gear of the gearbox unit. The second spur gear is connected to a third spur gear which, for example, is disposed on the shaft assigned to the second spur gear, and is thus axially offset to the second spur gear and conjointly rotates with the latter in a rotation of the second spur gear. The third spur gear in this instance engages so as to mesh with a fourth spur gear, for example, which meshes with the spindle nut.

In order for a reduction gearbox to be configured, the first spur gear herein may have a diameter that is smaller than the second spur gear, and the third spur gear may have a diameter that is smaller than the fourth spur gear. The rotation axes of all of the spur gears herein are preferably directed so as to be mutually parallel along the longitudinal direction.

BRIEF DESCRIPTION OF THE DRAWINGS

The concept on which the invention is based is to be explained in further detail hereunder by means of the exemplary embodiments illustrated in the figures in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A vehicle seat assembly is known from EP 1 658 451 B1, for example.

Another example of a vehicle seat assembly is moreover known from DE 198 15 283 A1 and may include one gearbox unit is in each case disposed on the seat rails of the pairs of rails and interacts with a spindle that is disposed so as to be rotationally fixed to the respectively assigned base rail. An electric motor which is connected to the gearbox units of both pairs of rails is disposed between the pairs of rails, such that the seat rails can be adjusted in the same direction and in a synchronous manner by conjointly driving the gearbox units of the pairs of rails.

For example, in the case of conventional vehicle seat assemblies, an electric motor is disposed on a support element that extends transversely between the seat rails of the pairs of rails, said electric motor being conjointly moved in the adjustment of the seat rails. This requires comparatively large installation space because the space between the pairs of rails through which the electric motor is moved in the adjustment of the seat rails has to be kept clear.

Figure 1:
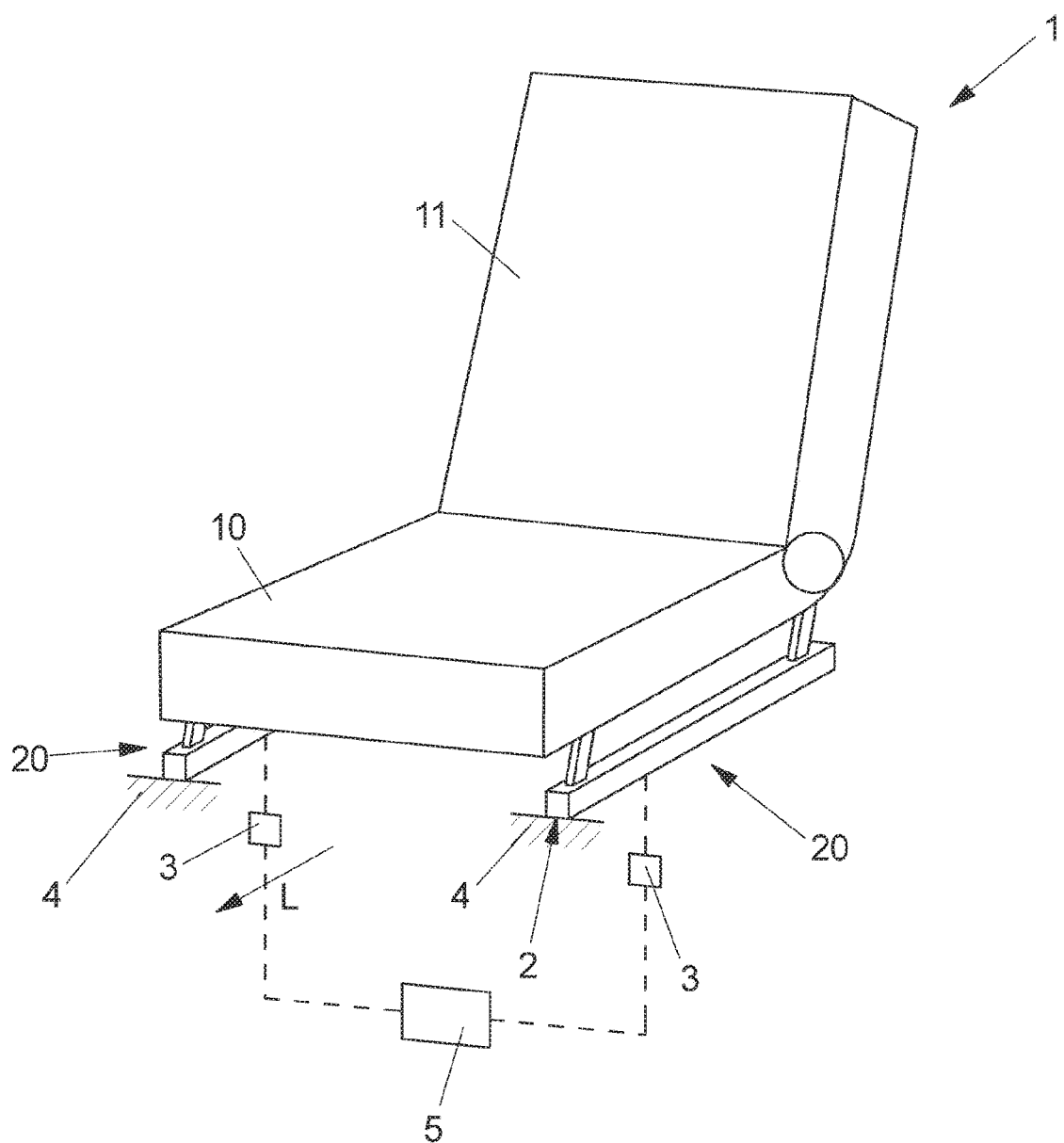
FIG. 1 shows a schematic illustration of a vehicle seat assembly.

FIG. 1 in a schematic view shows a vehicle seat assembly 1 which has a seat frame having a seat part 10 and a backrest part 11 which, for setting a comfortable position, is pivotable in relation to the seat part 10. The vehicle seat assembly 1 can, for example, implement a front seat or else a rear seat in a vehicle, and by way of two pairs of rails 20 which extend so as to be mutually parallel and are directed along a longitudinal direction L is connected to a vehicle floor 4, and by way of said pairs of rails 20 is established in the vehicle.

The pairs of rails 20 are a component part of a longitudinal adjustment installation 2 in the context of which the longitudinal position of the seat frame can be set longitudinally along the longitudinal direction L. To this end, as is schematically shown in FIG. 1, the pairs of rails 20 are connected to drive installations 3 which are actuated by way of a common control installation 5 so as to set the longitudinal position of the vehicle seat assembly 1 by way of said drive installations 3.

FIGS. 2 to 5 show an exemplary embodiment of a pair of rails 20. Both pairs of rails 20 of the vehicle seat assembly 1 illustrated in FIG. 1 herein are preferably constructed so as to be functionally identical so that the following description applies to both pairs of rails 20 illustrated in FIG. 1.

Figure 5:
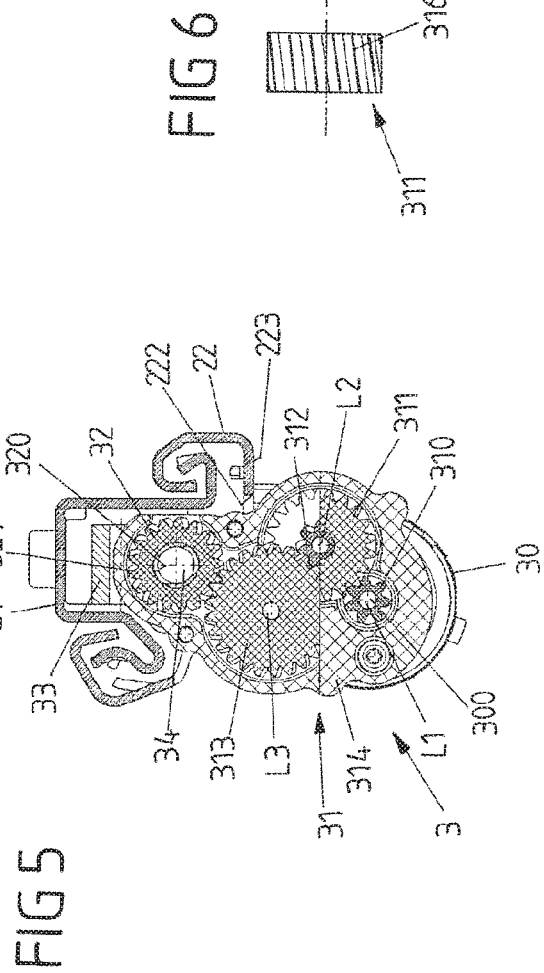
FIG. 5 shows a sectional view along the line B-B according to FIG. 4.

The pair of rails 20 has a seat rail 21 which (for example by way of a height-adjustment installation) is connected to the seat frame and which is guided so as to be displaceable along the longitudinal direction L on a base rail 22 that is to be fastened to the vehicle floor 4, and to this end engages in the base rail 22, as can be seen from the cross-sectional view according to FIG. 5. Fastening elements 220, 221 by way of which the base rail 22 can be fastened to the vehicle floor 4 are attached to a base 223 of the base rail 22.

The pair of rails 20 is assigned a (dedicated) drive installation 3 which is configured as a spindle drive. The drive installation 3 has a spindle 34 which, by way of fastening elements 340, 341 is disposed so as to be stationary on the seat rail 21 and which, by way of an external thread, is in thread engagement with an internal thread 320 of the spindle nut 32. The spindle nut 32 is mounted so as to be rotatable in the gearbox housing 314 of a gearbox unit 31 and by way of the gearbox unit 31 is operatively connected to an electric motor 30 such that the spindle nut 32, driven by the electric motor 30, can be set in a rotating movement. By virtue of the thread engagement, the spindle nut 32 in the rotation of the spindle nut 32 rolls on the spindle 34 so that the spindle 34 is longitudinally adjusted along the longitudinal direction L in relation to the spindle nut 32, and the seat rail 21 thereby is displaced in relation to the base rail 22.

The spindle 34 is disposed so as to be stationary on the seat rail 21, while the spindle nut 32 (when viewed along the longitudinal direction L) is mounted so as to be locationally fixed but rotatable on the base rail 23. The gearbox housing 314, by way of a holding angle bracket 33 which engages through an opening 222 in the base 223 of the base rail 22, is fixedly connected to the base rail 22, and the electric motor 30, by way of the gearbox housing 314, is also established on the base rail 22.

When in operation, the electric motor 30 drives the spindle nut 32. The electric motor 30 and the gearbox unit 31 herein remain so as to be locationally fixed on the base rail 22, while the spindle 34 by way of the spindle nut 32 is longitudinally adjusted and thereby the seat rail 21 is displaced along the longitudinal direction L.

The gearbox housing 314 by way of an anti-rotation safeguard 315 is connected to the holding angle bracket 33 so as to be secured against rotation and is thus supported on the holding angle bracket 33. Forces and moments of that arise on the gearbox housing 314 in a transmission of torque by way of the gearbox unit 31 are thus reliably supported and discharged.

The holding angle bracket 33 in the cross section has a substantially U-shaped design and by way of flanges that project transversely in relation to the legs of the U is fixedly connected to the base 223 of the base rail 22.

Figure 6:
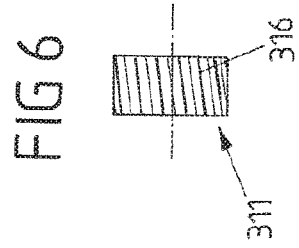
FIG. 6 shows a schematic view of the spur gear of a gearbox unit.

The gearbox unit 31 has a spur gearing having spur gears 310-313 which, by way of toothings, engage so as to mesh with one another. The end-side toothings of the spur gears 310-313 herein are preferably configured as helical toothings, as is schematically illustrated by means of the spur gear 311 which in FIG. 6 has a helical toothing 316.

The electric motor 30 has a driveshaft 300 which is directed longitudinally along the longitudinal direction L and is rotatable about a first rotation axis L1. A first spur gear 310 which engages so as to mesh with the second spur gear 311 is disposed on the driveshaft 300. As can be seen from the sectional view according to FIG. 5, a third spur gear 312 which is axially offset to the second spur gear 311 and in a rotating movement of the second spur gear 311 is rotated conjointly with the latter, is disposed on the shaft that is rotatable about a rotation axis L2 and is assigned to the second spur gear 311. The third spur gear 312 by way of a toothing engages with a fourth spur gear 313 which is rotatable about a rotation axis L3 which is directed so as to be parallel to the other rotation axes L1, L2 and extends along the longitudinal direction L.

The fourth spur gear 313 by way of the toothing on the end side thereof is in thread engagement with the external toothing 321 of the spindle nut 32. The spindle nut 32 is rotatable about the spindle 34 so that the rotation axis of the spindle nut 32 is directed so as to be parallel to the rotation axes L1-L3 of the spur gears 310-313.

The gearbox unit 31 by way of the spur gears 310-313 thereof configures two gear ranges. Because the diameter of the first spur gear 310 is smaller than the diameter of the second spur gear 311, and the diameter of the third spur gear 312 is moreover smaller than the diameter of the fourth spur gear 313, a high gear reduction is provided. The pairing of the first spur gear 312 with the second spur gear 311 implements a first gear range, while the pairing of the third spur gear 312 with the fourth spur gear 313 provides a second gear range.

The meshing engagement between the spur gears 310-313 and also between the last spur gear 313 and the spindle nut 314 may not self-locking. A gearbox unit 31 with high efficiency and moreover a large reduction results from using a helical toothing, and moreover on account of the non-self-locking engagement of the spur gears 310-313, this enables an electric motor 30 of a comparatively small construction mode.

The thread engagement between the spindle 34 and the spindle nut 32 herein can however be self-locking such that the gearbox unit 34 overall is self-locking. However, a self-locking mechanism herein exists only between the spindle 32 and the internal thread 320 of the spindle nut 32.

On account of the rotation axis L1 of the driveshaft 300 being directed so as to be parallel to the longitudinal direction L, the electric motor 30 can be disposed so as to be rail-parallel to the base rail 22. In the case of the exemplary embodiment illustrated, the electric motor 30 is disposed below the base 223 of the base rail 22 and in the disposal of the base rail 22 on the vehicle floor 4 is received in an assigned recess in the vehicle floor 4, for example, so that the electric motor 30 is obscured and hidden from the outside.

It is also conceivable and possible herein for the pair of rails 20 overall to be received in a duct or the like configured in the vehicle floor 4 such that the pair of rails 20 overall is sunk in the vehicle floor 4 and can be covered by a carpet, for example. Only assembly parts, for example in the form of swing arms for connecting the pair of rails 20 to the seat frame, extend in this case through a slot in the carpet, for example, and are visible from the outside. In this way, the longitudinal adjustment installation 2 can be completely hidden in the vehicle floor 4.

Figure 2:
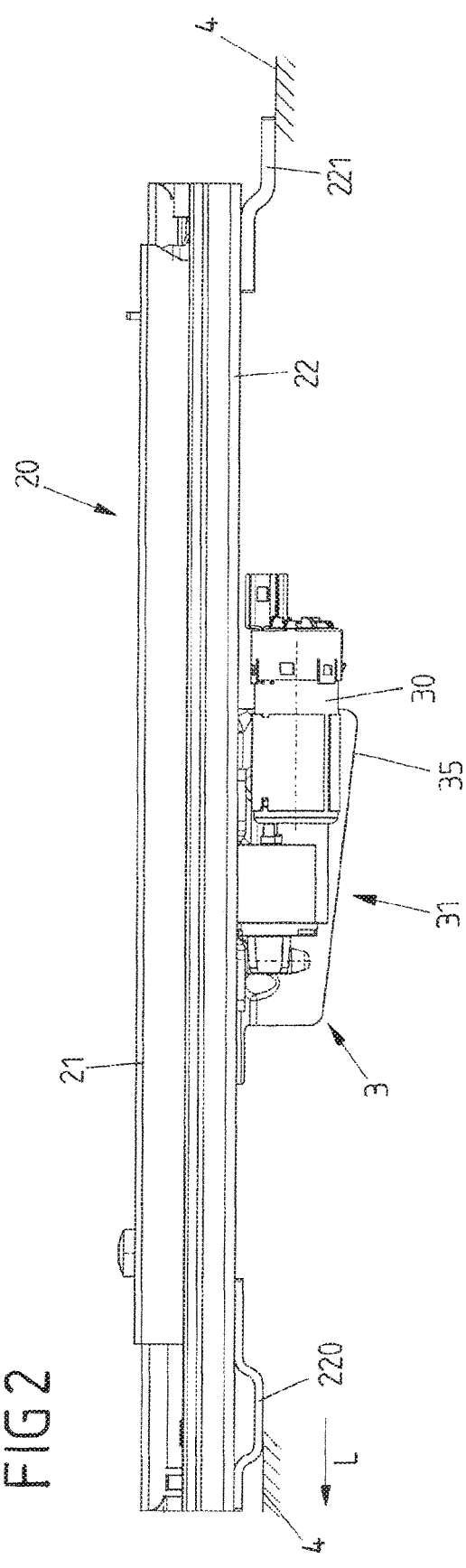
FIG. 2 shows a lateral view of a pair of rails of the vehicle seat assembly, having a seat rail and a base rail.
Figure 3:
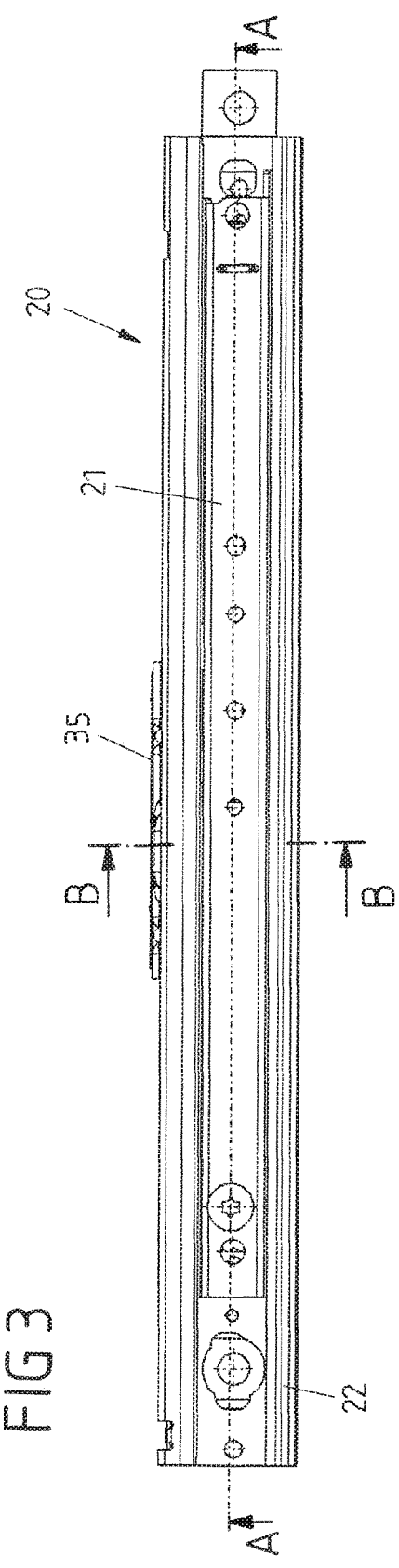
FIG. 3 shows a plan view of the pair of rails.
Figure 4:
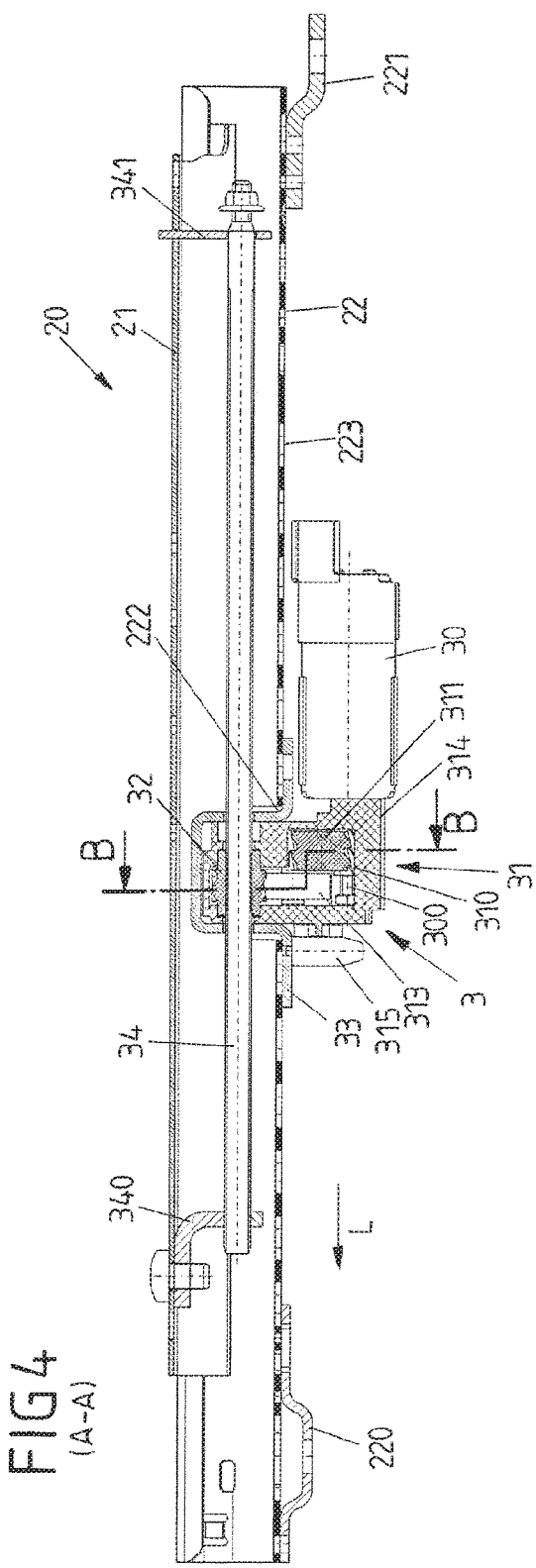
FIG. 4 shows a sectional view along the line A-A according to FIG. 3.

As can be seen from FIG. 2 and FIG. 3, a reinforcement element 35 in the form of a sheet-metal element which is attached laterally to the base rail 22 and which reinforces the base rail 22 in the region of the opening 222 formed in the base 223 is provided in the case of the exemplary embodiment illustrated.

The reinforcement element 35 reinforces the base rail 22, on the one hand. On the other hand, said reinforcement element 35 also laterally covers the electric motor 30 and the gearbox unit 31 such that the electric motor 30 and the gearbox unit 31 are additionally protected.

In the case of the vehicle seat assembly 1 as is schematically illustrated in FIG. 1, each pair of rails 20 is assigned a dedicated drive installation 3 which, by way of a control installation 5, can be operated and controlled in a synchronous manner. On account of each pair of rails 20 possessing a dedicated separate drive installation 3 which is disposed in a compact manner in the region of the respectively assigned pair of rails 20, the installation space between the pair of rails 20 remains free so that an assembly which is favorable in terms of installation space is achieved.

The concept on which the invention is based is not limited to the exemplary embodiments described above but can in principle also be implemented in an entirely different manner.

The gearbox unit can also have a design that is different from the one illustrated and described here. In particular, the gearbox unit can have more or fewer spur gears than described, wherein other gearbox elements can also be present in addition to the spur gears, for example.

The spur gears can have a helical toothing. This however is not mandatory. Instead, the spur gears can also have a spur toothing, for example.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

LIST OF REFERENCE SIGNS

1 Vehicle seat
10 Seat part
11 Backrest part
2 Longitudinal adjustment
20 Pair of rails
21 Seat rail
22 Base rail
220, 221 Fastening element
222 Opening
223 Base
3 Drive installation
30 Electric motor
300 Drive shaft
31 Gearbox unit
310-313 Gear (spur gear)
314 Gearbox housing
315 Anti-rotation safeguard
316 Helical toothing
32 Spindle nut
320 Internal thread
321 External toothing
33 Holding element (holding angle bracket)
34 Spindle
340, 341 Fastening element
35 Reinforcement element (sheet-metal element)
4 Vehicle floor
5 Control installation
L Longitudinal direction
L1-L3 Rotation axis

The invention claimed is:

1. A vehicle seat assembly comprising:
a seat frame;
at least one pair of rails including a seat rail, connected to the seat frame, and a base rail configured to be connected to a vehicle floor, wherein the seat rail is configured to be guided by the base rail so that the seat rail is displaceable along a longitudinal direction; and
a drive device configured to adjust the seat rail along the longitudinal direction with respect to the base rail, wherein the drive device includes
a spindle,
a spindle nut that, by way of a thread engagement, is mounted to be rotatable on the spindle,
a gearbox unit operatively connected to the spindle nut and including at least two spur gears each rotatable about rotation axes extending so as to be mutually parallel and aligned along the longitudinal direction, wherein the at least two spur gears include helical teeth, and
an electric motor configured to drive the spindle nut via the gearbox unit,
wherein the spindle is disposed on the seat rail, and the spindle nut and the gearbox unit are disposed on the base rail.

2. The vehicle seat assembly of claim 1, wherein the vehicle seat assembly includes a first pair of rails and a second pair of rails, wherein the drive device is coupled to the first pair of rails and another drive device is coupled to the second pair of rails.

3. The vehicle seat assembly of claim 1, wherein the gearbox unit includes a gearbox housing fixedly connected to the base rail.

4. The vehicle seat assembly of claim 3, wherein the spindle nut is mounted in the gearbox housing, wherein the gearbox housing is configured to engage an anti-rotation safeguard to stop the gearbox housing from rotating with respect the base rail.

5. The vehicle seat assembly of claim 3, wherein the gearbox housing protrudes through an opening formed by the base rail.

6. The vehicle seat assembly of claim 5, further comprising a holding angle bracket extending through the opening, wherein the holding angle bracket connects the gearbox housing that engages to the base rail.

7. The vehicle seat assembly of claim 5, wherein the opening is formed by a base of the base rail, wherein the base faces away from the seat rail.

8. The vehicle seat assembly of claim 7, wherein the electric motor of the drive device is disposed on a side of the base of the base rail.

9. The vehicle seat assembly of claim 6, wherein the holding angle bracket at least partially encompasses the gearbox housing.

10. The vehicle seat assembly of claim 6, wherein the gearbox housing includes a first side and a second side, aligned with the first side with respect to the longitudinal direction, wherein the first side and the second side are each supported by the holding angle bracket.

11. The vehicle seat assembly of claim 1, wherein the gearbox unit has at least two gear ranges.

12. The vehicle seat assembly of claim 1, wherein the spindle nut includes an external toothing configured to mesh with a first spur gear of the at least two spur gears such that the spindle nut rotates as the first spur gear rotates.

13. The vehicle seat assembly of claim 12, wherein engagement between threads of the spindle nut and threads of the spindle are configured to create a self-locking condition.

14. A vehicle seat assembly comprising:
a seat frame;
at least one pair of rails including a seat rail, connected to the seat frame, and a base rail configured to be connected to a vehicle floor, wherein the seat rail is configured to be guided by the base rail so that the seat rail is displaceable along a longitudinal direction; and
a drive device configured to adjust the seat rail along the longitudinal direction with respect to the base rail, wherein the drive device includes
a spindle,
a rotatable spindle nut that, by way of a thread engagement, is mounted to be rotatable on the spindle,
a gearbox unit operatively connected to the spindle nut, and
an electric motor including a drive shaft extending along the longitudinal direction and configured to rotate about the longitudinal direction to drive the spindle nut via the gearbox unit,
wherein the spindle is disposed on the seat rail, and the spindle nut and the gearbox unit are disposed on the base rail.

15. The vehicle seat assembly of claim 14, wherein the drive shaft of the electric motor supports a first spur gear, wherein the first spur gear engages and meshes with a second spur gear.

16. The vehicle seat assembly of claim 15, wherein the second spur gear is connected to a third spur gear axially offset from the second spur gear and conjointly rotates in a rotational direction of the second spur gear.

17. The vehicle seat assembly of claim 16, wherein the third spur gear engages and meshes with a fourth spur gear.

18. The vehicle seat assembly of claim 17, wherein the fourth spur gear engages and meshes with the spindle nut.

* * * * *